United States Patent [19]
Millham et al.

[11] 4,130,240
[45] Dec. 19, 1978

[54] DYNAMIC ERROR LOCATION

[75] Inventors: Ernest H. Millham, Warrenton; Ralph J. Scaccia, Fairfax, both of Va.; Francis J. Villante, Greene, N.Y.

[73] Assignee: International Business Machines Corporation, Armonk, N.Y.

[21] Appl. No.: 829,307

[22] Filed: Aug. 31, 1977

[51] Int. Cl.² .................................................. G06F 11/04
[52] U.S. Cl. ............................ 235/303.1; 235/304; 364/200
[58] Field of Search ............... 235/303.1, 304, 304.2; 364/200, 900

[56] References Cited
U.S. PATENT DOCUMENTS

| | | | |
|---|---|---|---|
| 3,226,684 | 12/1965 | Cox | 235/303.1 |
| 3,564,506 | 2/1971 | Bee et al. | 364/200 |
| 3,688,274 | 8/1972 | Cormier et al. | 364/200 |
| 3,736,566 | 5/1973 | Anderson et al. | 235/303.1 |

OTHER PUBLICATIONS

Hicks et al., Instruction Retry Mechanism for a Computer, IBM Technical Disclosure Bulletin, vol. 17, No. 8, Jan. 1975, pp. 2239-2242.

*Primary Examiner*—Charles E. Atkinson
*Attorney, Agent, or Firm*—John E. Hoel

[57] ABSTRACT

A technique is disclosed for locating the exact machine cycle, in a cyclic operation for a data processor, where an error occurs. Each cycle of the data processor is identified and counted as a cycle where the machine stopped with an error indication that is recorded. The cycles are then all caused to reoccur up to the cycle just preceding that cycle recorded and the machine is caused to stop without allowing the recorded cycle to occur. At this point it is determined whether an error did in fact occur. If an error did in fact occur, then the procedure is repeated, each time allowing the system to process to one cycle less than the preceding last cycle, until the error is no longer present. At this point, the true cycle with which the error occurs is identified as the next cycle just following the last one at which the processor was stopped. The technique may be augmented by suppressing error detections for the cycle so identified, and advancing the processor to succeeding cycles to determine whether any succeeding cycle also generates errors.

2 Claims, 3 Drawing Figures

DYNAMIC ERROR LOCATION

FIELD OF THE INVENTION

The invention disclosed generally relates to data processing and testing systems and more particularly is directed to error diagnostic mechanisms for electronic data processors.

BACKGROUND OF THE INVENTION

Typically in high speed testing and computing system when a failure occurs it is difficult and in some cases, impossible to exactly identify the cycle, memory address and/or function being performed at the time of the error. The problem is one of recognizing the failure and feeding back information to inhibit further processing prior to the execution of any subsequent events. This phenomena may be referred to as system hysterisis and often results in the processing of several events before the system can be stopped. More specifically, given a machine performing a function on each oscillator cycle and with a hysteresis (time to stop the oscillator) of N cycles then the machine, when an error is detected, will stop N cycles past where the error actually occured. This situation would be acceptable if all error types always exhibited the same hysteresis since the failing cycle could always be located by deductive reasoning. Since hysteresis is not always the same and not always identifiable with absolute accuracy, it becomes necessary to provide other means for locating errors. This has typically been solved by manually operating the machine at slow enough rates whereby the system hysteresis is no longer a factor. Since many errors are cycle rate dependent and occur only when the machine is operating at full speed the use of this technique often causes the error to not reoccur. When this happens locating the error results in exhaustive and time consuming diagnostic techniques often of a hit or miss nature, until repairs can finally be initiated.

The foregoing is a generalization of a specific problem as applied to general purpose computing systems.

In testing machines where the cycle rate is continuously variable, as is the hysteresis and where the failing cycle need be specifically identified, and where the cycle rate is critical there has been prior to this invention, no method to identify with certainty the exact cycle wherein an error occured. While this primarily applies to dynamic functional speed test systems it should be obvious to those skilled in the art that a similar situation exists in all test applications.

OBJECTS OF THE INVENTION

It is therefore an object of the invention to locate the machine cycle generating a detected error in a cyclic data processor in an improved manner.

SUMMARY OF THE INVENTION:

These and other objects are accomplished by the dynamic error location apparatus disclosed herein.

A technique is disclosed for locating the exact machine cycle, in a cyclic operation for a data processor, where an error occurs. Each cycle of the data processor is identified and counted as a cycle where the machine stopped with an error indication that is recorded. The cycles are then all caused to reoccur up to the cycle just preceding that cycle recorded and the machine is caused to stop without allowing the recorded cycle to occur. At this point it is determined whether an error did in fact occur. If an error did in fact occur, then the procedure is repeated, each time allowing the system to process to one cycle less than the preceding last cycle, until the error is no longer present. At this point, the true cycle with which the error occurs is identified as the next cycle just following the last one at which the processor was stopped. The technique may be augmented by suppressing error detections for the cycle so identified, and advancing the processor to succeeding cycles to determine whether any succeeding cycle also generates errors. FIGS. 1 and 2 illustrate the functional block diagram for the dynamic error location apparatus.

DESCRIPTION OF THE FIGURES

These and other objects, features and advantages of the invention will be more fully understood with reference to the accompanying drawings.

Figure 1A:
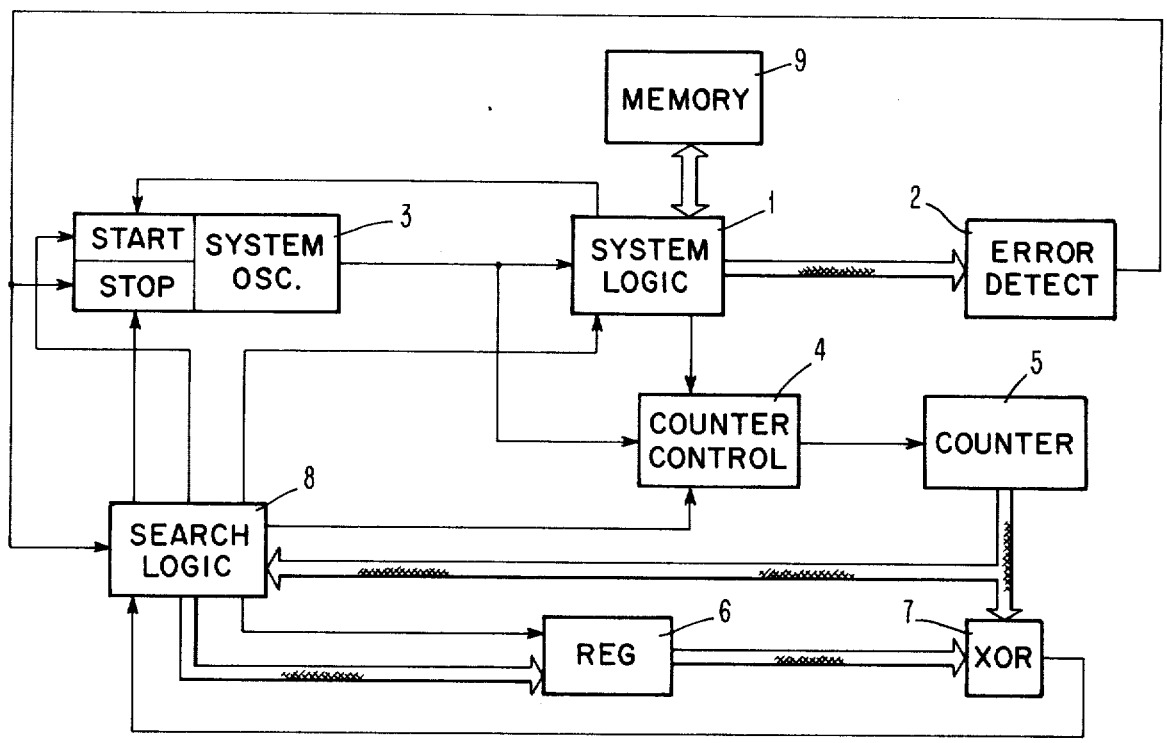
FIG. 1a is a general flow diagram and FIG. 1b is a timing diagram for a typical logic system as modified by this invention.
Figure 1B:
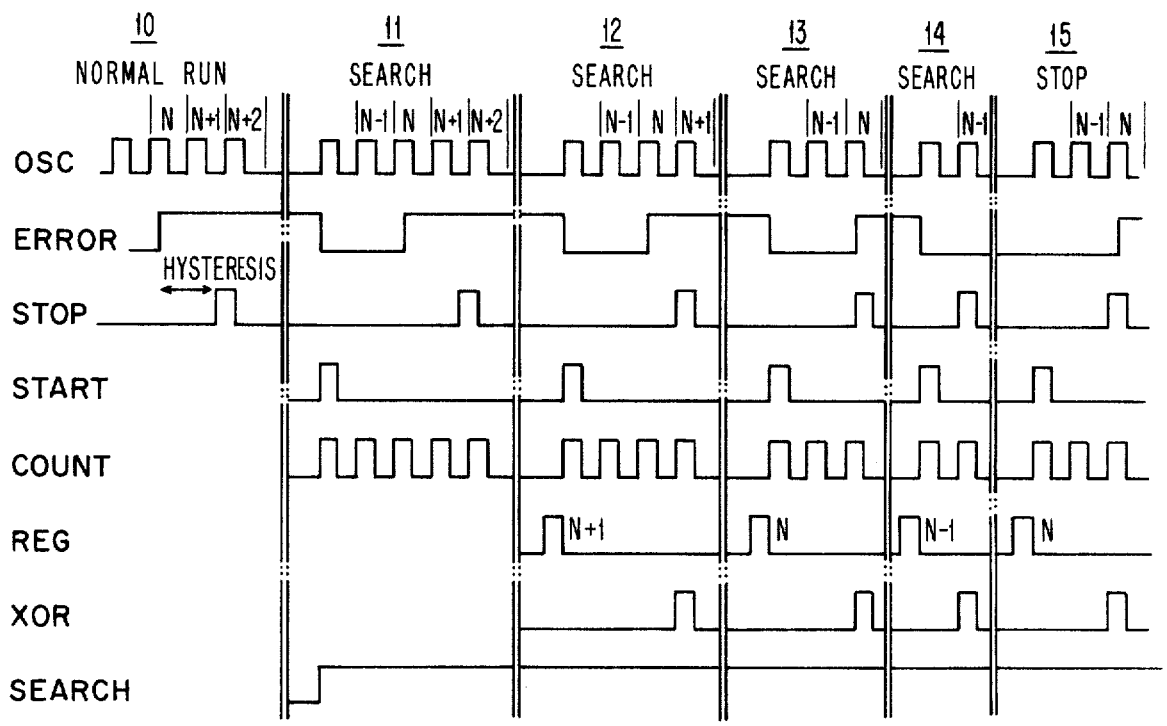

DISCUSSION OF THE PREFERRED EMBODIMENT:

FIG. 1 is a flow diagram of a typical logical machine or computing system consisting of System Logic 1, Error Detection 2, Memory 9 and System Oscillator 3. The remainder of FIG. 1 is an embodiment of this invention together with a timing diagram of system operation. Basic system and search timing are derived from System Oscillator 3 which may be gated on or off by means familiar to those versed in the art. In normal operation only those functions associated with normal system functions are active. Upon detection of a system error as seen in Normal Run 10 the Error Detect 2 will cause the System Oscillator 3 to stop following some system hysteresis. The hysteresis results from signal propagation delay, system layout and design, and the need to stop the oscillator at the end of a cycle. For illustration purposes it is assumed for the system of FIG. 1 has a hysteresis of about two oscillator cycles. Actual hysteresis is unimportant so long as the maximum possible is known for any specific system. With the system stopped the operator or external program means may initiate the search operation together with instructions for restarting the system at some specified cycle prior to where the system previously stopped. The Search Logic 8 initiates the Register 6 and the Counter Control 4 to enable the Counter 5 and starts the System Oscillator 3. The system starts running on the cycle identified to the System Logic 1. Normal processing will continue as noted in Search 11 together with the Counter 5 advancing one count for each oscillator cycle. Upon detecting the error again the system will stop as previously described. The Counter 5 then contains the count of the oscillator cycles executed since processing was initiated. This value is decremented by one and loaded into Register 6 by Search Logic 8. The Counter 5 is reset and the system is again started at the initially selected cycle. Search 12 and Search 13 are illustrative of typical cycles while searching for the error. During these cycles the stop is initiated by Counter 5 being equal to the contents of Register 6 as detected by Exclusive OR 7. Following a delay greater than the worst case system hysteresis the Error Detect 2 is checked by Search Logic 8. If an error exists another cycle is initiated identical to search 11 and Search 13. If no error exists (Search 14) the Search Logic 8 will initiate a Stop 15 cycle. In this case the counter is incremented by one and loaded into Register 6. The Counter 5 is reset and the system again started. When Counter 5 is equal to the contents of Register 6, XOR 7 causes the system to stop. The error will be displayed and the system will be stopped on the exact cycle where the error occured. Normal diagnostic proceedures are then followed. The event or function to be monitored within the system may be selected by the operator or through program means depending on the type of error indicated. Additionally, it may be desirable, depending on the system configuration, to provide a multiplicity of dynamic error location means.

Figure 2:
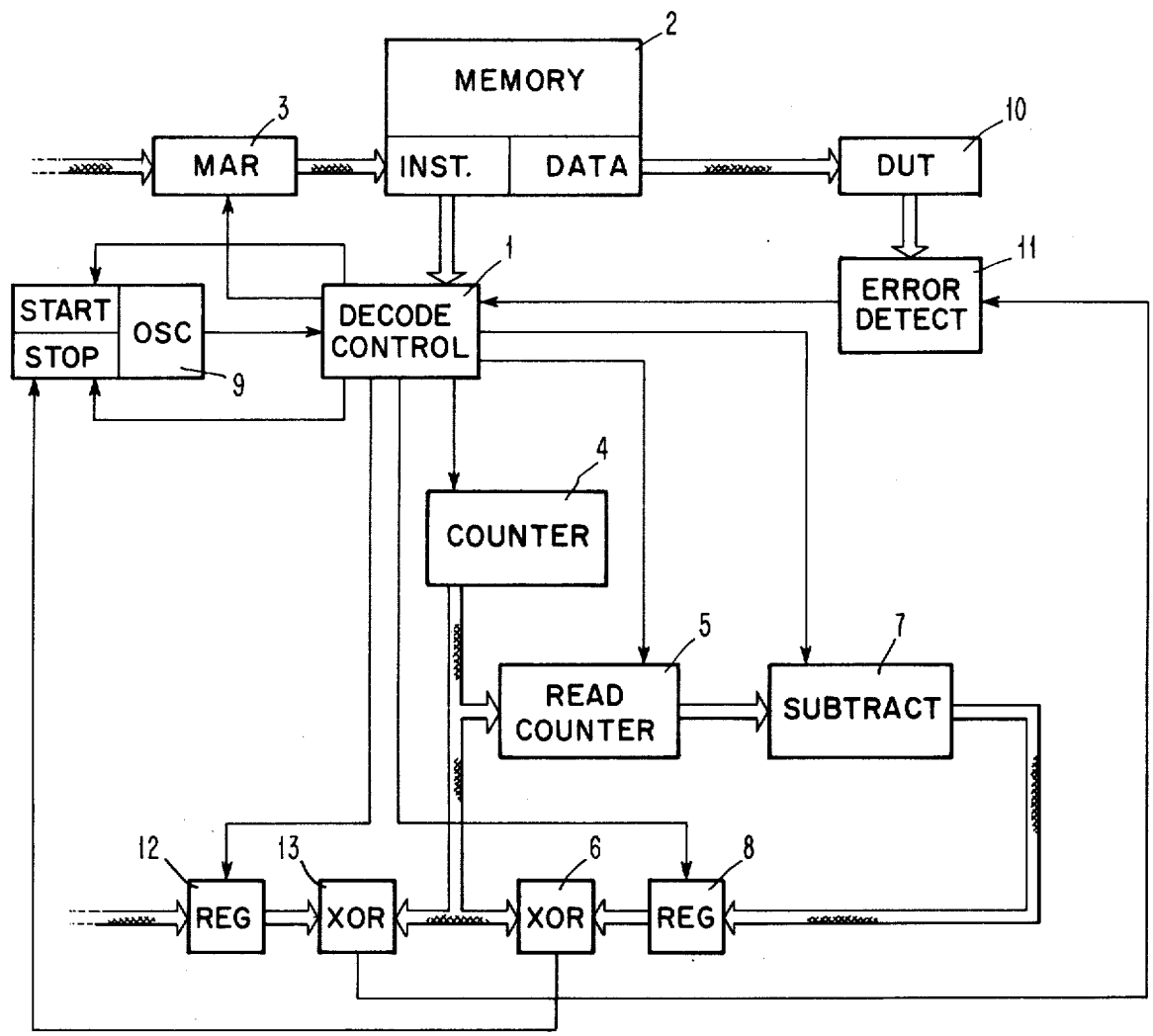
FIG. 2 is a schematic block diagram of a test system embodiment of this invention.

FIG. 2 is illustrative of a specific case of a functional speed test system. In a test system Memory 2 is typically supplying data for testing the Device Under Test 10 at a rate defined by Oscillator 9 as identified by Memory Address Register 3 under control of Decode Control 1. The Counter 5 is an integral part of the test system counting oscillator cycles each of which is identified as a test. DUT 10 responses are compared with expected values by Error Detect 11, and in the case of an error cause the system to stop. The Counter 4 is read by Read Counter 5, one is subtracted by Subtractor 7 and the result is loaded into Register 8. The system is restarted at memory address zero and the preceeding steps repeated until the error is no longer detected. The actual number of the cycle (test) where the error occured is contained in Counter 4 plus one count. Additionally, in a test system, it is often required to locate and record all or a set of failing tests. This function is accomplished by loading the actual cycle count of the last error plus one into Register 12. The system is started with Error Detect 11 set to ignore all errors. The Counter 5 is compared to Register 12 and on the cycle following that where the last error was located, the XOR 13 signals the Error Detect 11 to start detecting errors. Upon detecting another error the search function is performed as previously described.

While the invention has been particularly shown and described with reference to the preferred embodiments thereof, it will be understood by those skilled in the art that the foregoing and other changes in form and details may be made therein without departing from the spirit and scope of the invention.

We claim:

1. In a digital processor which processes data in response to a sequence of machine instructions issued in response to a system clock and having an error detector which issues an error signal whenever an abnormal operation occurs in the digital processor, a dynamic error location mechanism for identifying the exact machine cycle where an error in the processed data occurs, comprising:
   a retry means connected to said error detector for restarting the sequence of machine instructions at an origin lying at a selected number of cycles preceding the cycle at which the error was detected;
   a counter connected to said system clock for counting the sequence of machine cycles from said origin;
   a register connected to said retry means for storing a value equal to said selected number minus one;
   a comparator connected to said counter and said register for comparing the values stored in said counter and said register;
   stopping means connected to said comparator and said system clock for stopping said system clock when said comparator determines that the contents of said counter equals the contents of said register;
   said retry means setting said register in response to said stopping means, to a value of said selected number minus two (2) if said error detector indicates that the error has occurred, and initiating said system clock at said origin;
   repeating the above steps until said error detector determines that no error has occurred;
   whereby the exact machine cycle at which an error actually occurs in a data processing system is determined.

2. The apparatus of claim 1, which further comprises:
   a second register connected to said retry means for storing the identity of the cycle within which said first error actually occurred;
   inhibit means connected to said error detector output to prevent the detection of said first error;
   said retry means restarting said system clock at said origin to determine whether a second error subsequent to said first error occurs in the machine cycle sequence.

* * * * *